(12) United States Patent
Christie et al.

(10) Patent No.: US 7,924,271 B2
(45) Date of Patent: Apr. 12, 2011

(54) DETECTING GESTURES ON MULTI-EVENT SENSITIVE DEVICES

(75) Inventors: Greg Christie, Cupertino, CA (US); Wayne Carl Westerman, San Francisco, CA (US)

(73) Assignee: Apple Inc., Cupertino, CA (US)

(\*) Notice: Subject to any disclaimer, the term of this patent is extended or adjusted under 35 U.S.C. 154(b) by 905 days.

(21) Appl. No.: 11/818,341

(22) Filed: Jun. 13, 2007

(65) Prior Publication Data

US 2008/0165140 A1 Jul. 10, 2008

Related U.S. Application Data

(60) Provisional application No. 60/878,898, filed on Jan. 5, 2007.

(51) Int. Cl.
*G09G 5/00* (2006.01)

(52) U.S. Cl. .......................................... 345/173; 463/37

(58) Field of Classification Search .......... 345/173–177; 463/37
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,590,219 A | 12/1996 | Gourdol | |
| 5,612,719 A | 3/1997 | Beernink et al. | |
| 5,798,758 A | 8/1998 | Harada et al. | |
| 5,825,352 A | 10/1998 | Bisset et al. | |
| 5,835,079 A | 11/1998 | Shieh | |
| 5,880,411 A | 3/1999 | Gillespie et al. | |
| 6,073,036 A | 6/2000 | Heikkinen et al. | |
| 6,188,391 B1 | 2/2001 | Seely et al. | |
| 6,208,329 B1\* | 3/2001 | Ballare | 345/173 |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 6,926,609 B2 | 8/2005 | Martin | |
| 7,015,894 B2 | 3/2006 | Morohoshi et al. | |
| 7,184,064 B2 | 2/2007 | Zimmerman et al. | |
| 7,358,962 B2\* | 4/2008 | Dehlin et al. | 345/173 |
| 7,411,575 B2\* | 8/2008 | Hill et al. | 345/156 |
| 7,461,343 B2\* | 12/2008 | Kates | 715/716 |
| 7,499,035 B2\* | 3/2009 | Kolmykov-Zotov et al. | 345/173 |
| 7,515,143 B2\* | 4/2009 | Keam et al. | 345/175 |
| 2002/0036618 A1 | 3/2002 | Wakai et al. | |
| 2005/0162402 A1 | 7/2005 | Watanachote | |

(Continued)

FOREIGN PATENT DOCUMENTS

EP 1517228 A2 3/2005

(Continued)

OTHER PUBLICATIONS

International Search Report and Written Opinion for PCT/US2007/089174, mailed Jan. 5, 2009 (27 pages).

(Continued)

*Primary Examiner* — Regina Liang
*Assistant Examiner* — Tom V Sheng
(74) *Attorney, Agent, or Firm* — Morrison & Foerster LLP

(57) ABSTRACT

A user interface method is disclosed. The method can include detecting gestures on or above a multi-event sensor panel and performing an action associated with detected gestures. Such action can include activating or changing a state of one or more GUI objects and emulate functions performed by a mouse or trackball input device.

22 Claims, 11 Drawing Sheets

U.S. PATENT DOCUMENTS

| | | | |
|---|---|---|---|
| 2006/0026521 A1 | 2/2006 | Hotelling et al. | |
| 2006/0026535 A1 | 2/2006 | Hotelling et al. | |
| 2006/0092142 A1 | 5/2006 | Gillespie et al. | |
| 2006/0097991 A1 | 5/2006 | Hotelling et al. | |
| 2006/0101354 A1 | 5/2006 | Hashimoto et al. | |
| 2006/0161846 A1* | 7/2006 | Van Leeuwen | 715/702 |
| 2006/0161871 A1 | 7/2006 | Hotelling et al. | |
| 2006/0197753 A1 | 9/2006 | Hotelling | |
| 2006/0238522 A1 | 10/2006 | Westerman et al. | |
| 2007/0236475 A1 | 10/2007 | Wherry | |
| 2007/0291009 A1 | 12/2007 | Wright et al. | |
| 2008/0024454 A1* | 1/2008 | Everest | 345/173 |
| 2008/0136785 A1* | 6/2008 | Baudisch et al. | 345/173 |
| 2008/0158145 A1 | 7/2008 | Westerman | |
| 2008/0158170 A1 | 7/2008 | Herz et al. | |
| 2008/0158172 A1 | 7/2008 | Hotelling et al. | |

FOREIGN PATENT DOCUMENTS

| | | | |
|---|---|---|---|
| JP | 2000-163031 A | 6/2000 | |
| JP | 2002-342033 A | 11/2002 | |
| WO | WO 2004/051392 A2 | 6/2004 | |
| WO | WO 2005/124526 A2 | 12/2005 | |
| WO | WO 2006/094308 A2 | 9/2006 | |
| WO | WO-2008/085791 A2 | 7/2008 | |

OTHER PUBLICATIONS

Rekimoto, J. et al., "SmartSkin: An Infrastructure for Freehand Manipulation on Interactive Surfaces", CHI 2002 Conference Proceedings, Minneapolis, Minnesota, Apr. 20-25, 2002.

Wu, Mike, et al., "Multi-Finger and Whole Hand Gestural Interaction Techniques for Multi-User Tabletop Displays," UIST 03, Proceedings of the 16$^{th}$ Annual ACM Symposium on User Interface Software and Technology, Vancouver, Canada, Nov. 2-5, 2003.

Anonymous. (Apr. 13, 2004). Proximity Sensor Demo Kit, User Guide, Version 0.62—Preliminary, Integration Associates, Inc., 14 pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

DETECTING GESTURES ON MULTI-EVENT SENSITIVE DEVICES

CROSS REFERENCE TO RELATED APPLICATIONS

The present invention claims the benefit under 35 USC 119(e) of U.S. provisional patent application Ser. No. 60/878,898 filed Jan. 5, 2007, the contents of which are incorporated by reference herein.

FIELD OF THE INVENTION

This relates to a system and method for controlling graphical user interface objects on a display by using gestures to effect commands.

BACKGROUND OF THE INVENTION

There exist today many styles of input devices for performing operations in a computer system. The operations generally correspond to moving a cursor and making selections on a display screen. The operations can also include paging, scrolling, panning, zooming, etc. By way of example, the input devices can include buttons, switches, keyboards, mice, trackballs, touch pads, joy sticks, touch screens and the like. Each of these devices has advantages and disadvantages that are taken into account when designing a computer system.

Buttons and switches are generally mechanical in nature and provide limited control with regards to the movement of the cursor and making selections. For example, they can be generally dedicated to moving the cursor in a specific direction (e.g., arrow keys) or to making specific selections (e.g., enter, delete, number, etc.).

In using a mouse instrument, the movement of the input pointer on a display generally corresponds to the relative movements of the mouse as the user moves the mouse along a surface. In using a trackball instrument, the movement of the input pointer on the display generally corresponds to the relative movements of a trackball as the user moves the ball within a housing. Mouse and trackball instruments typically also can include one or more buttons for making selections. A mouse instrument can also include scroll wheels that allow a user to scroll the displayed content by rolling the wheel forward or backward.

With touch pad instruments such as touch pads on a personal laptop computer, the movement of the input pointer on a display generally corresponds to the relative movements of the user's finger (or stylus) as the finger is moved along a surface of the touch pad. Touch screens, on the other hand, are a type of display screen that typically can include a touch-sensitive transparent panel (or "skin") that can overlay the display screen. When using a touch screen, a user typically makes a selection on the display screen by pointing directly to objects (such as GUI objects) displayed on the screen (usually with a stylus or finger).

To provide additional functionality, hand gestures have been implemented with some of these input devices. By way of example, in touch pads, selections can be made when one or more taps are detected on the surface of the touch pad. In some cases, any portion of the touch pad can be tapped, and in other cases a dedicated portion of the touch pad can be tapped. In addition to selections, scrolling can be initiated by using finger motion at the edge of the touch pad.

U.S. Pat. Nos. 5,612,719 and 5,590,219, assigned to Apple Computer, Inc. describe some other uses of gesturing. U.S. Pat. No. 5,612,719 discloses an onscreen button that is responsive to at least two different button gestures made on the screen on or near the button. U.S. Pat. No. 5,590,219 discloses a method for recognizing an ellipse-type gesture input on a display screen of a computer system.

In recent times, more advanced gestures have been implemented. For example, scrolling can be initiated by placing four fingers on the touch pad so that the scrolling gesture is recognized and thereafter moving these fingers on the touch pad to perform scrolling events. The methods for implementing these advanced gestures, however, can be limited and in many instances counter intuitive. In certain applications, especially applications involving managing or editing media files using a computer system, hand gestures using touch screens can allow a user to more efficiently and accurately effect intended operations.

SUMMARY OF THE INVENTION

This relates to detecting gestures with event sensitive devices (such as a touch/proximity sensitive display) for effecting commands on a computer system. Specifically, gestural inputs of a human hand over a touch/proximity sensitive device can be used to control and manipulate graphical user interface objects, such as opening, moving and viewing graphical user interface objects. Gestural inputs over an event sensitive computer desktop application display can be used to effect conventional mouse/trackball actions, such as target, select, right click action, scrolling, etc. Gestural inputs can also invoke the activation of an UI element, after which gestural interactions with the invoked UI element can effect further functions.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention can be practiced. It is to be understood that other embodiments can be utilized and structural changes can be made without departing from the scope of the preferred embodiments of the present invention.

Figure 1:
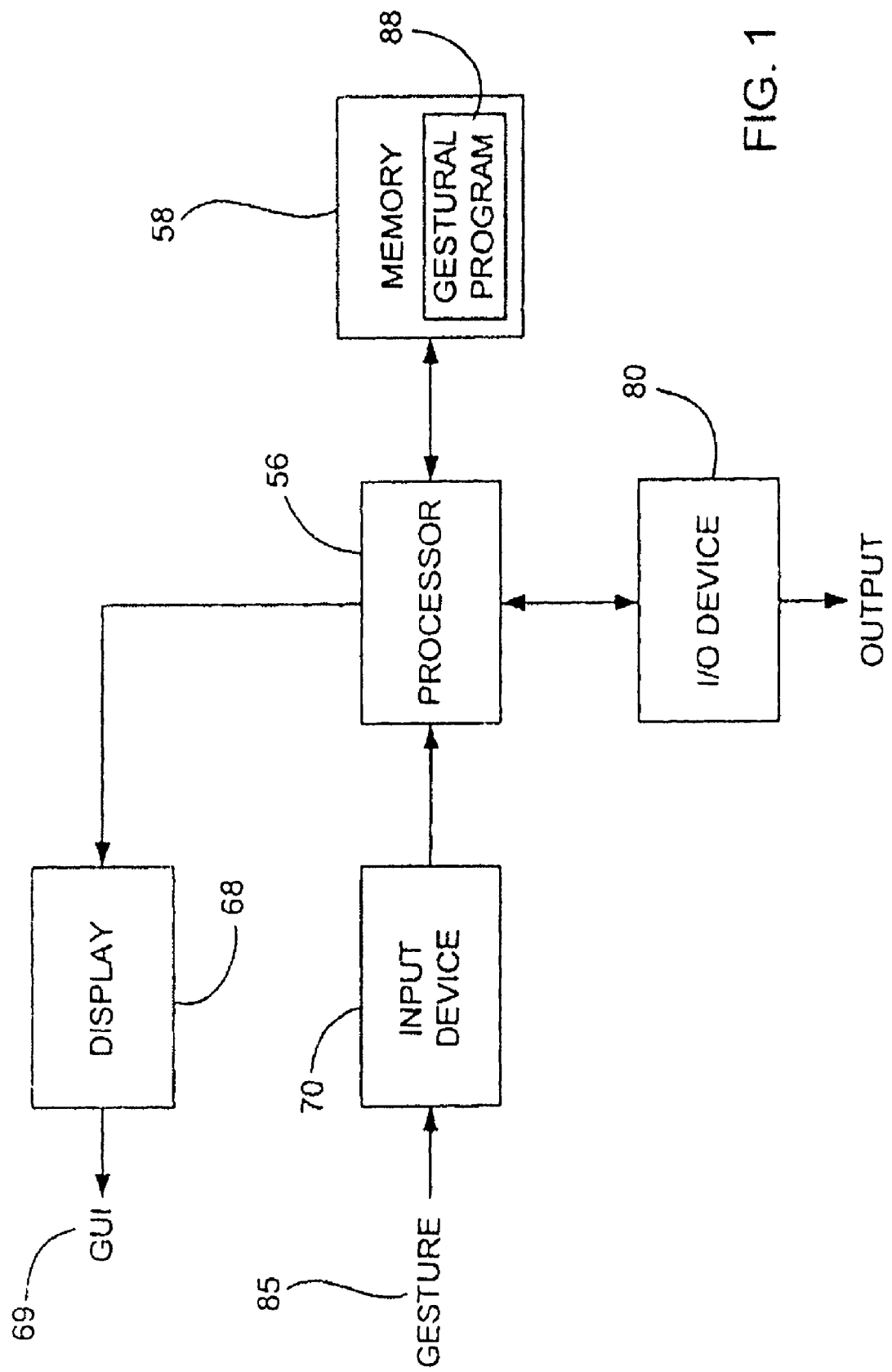
FIG. 1 is a block diagram of a computer system according to an exemplary embodiment of this invention.

FIG. 1 is a block diagram of an exemplary computer system 50 in accordance with one embodiment of the present invention. Computer system 50 can correspond to a personal computer system, such as a desktops, laptops, tablets or handheld computer. Computer system 50 can also correspond to a computing device, such as a mobile phone, PDA, dedicated media player, consumer electronic device, and the like.

The exemplary computer system 50 shown in FIG. 1 can include a processor 56 configured to execute instructions and to carry out operations associated with computer system 50. For example, using instructions retrieved for example from memory, processor 56 can control the reception and manipulation of input and output data between components of computing system 50. Processor 56 can be implemented on a single-chip, multiple chips or multiple electrical components. For example, various architectures can be used for processor 56, including dedicated or embedded processor, single purpose processor, controller, ASIC, and so forth.

In most cases, processor 56 together with an operating system can operate to execute computer code and produce and use data. Operating systems are generally well known and will not be described in greater detail. By way of example, the operating system can correspond to OS/2, DOS, Unix, Linux, Palm OS, and the like. The operating system can also be a special purpose operating system, such as can be used for limited purpose appliance-type computing devices. The operating system, other computer code and data can reside within memory block 58 that is operatively coupled to processor 56. Memory block 58 generally provides a place to store computer code and data that are used by computer system 50. By way of example, memory block 58 can include Read-Only Memory (ROM), Random-Access Memory (RAM), hard disk drive and/or the like. The information could also reside on a removable storage medium and loaded or installed onto computer system 50 when needed. Removable storage mediums include, for example, CD-ROM, PC-CARD, memory card, floppy disk, magnetic tape, and a network component.

Computer system 50 can also include display device 68 that is operatively coupled to processor 56. Display device 68 can be a liquid crystal display (LCD) (e.g., active matrix, passive matrix and the like). Alternatively, display device 68 can be a monitor such as a monochrome display, color graphics adapter (CGA) display, enhanced graphics adapter (EGA) display, variable-graphics-array (VGA) display, super VGA display, cathode ray tube (CRT), and the like. Display device 68 can also correspond to a plasma display or a display implemented with electronic inks.

Display device 68 can generally be configured to display graphical user interface (GUI) 69 that can provide an easy to use interface between a user of the computer system and the operating system or application running thereon. Generally speaking, GUI 69 can represent programs, files and operational options with graphical images, objects, or vector representations. The graphical images can include windows, fields, dialog boxes, menus, icons, buttons, cursors, scroll bars, etc. Such images can be arranged in predefined layouts, or can be created dynamically to serve the specific actions being taken by a user. During operation, the user can select and/or activate various graphical images in order to initiate functions and tasks associated therewith. By way of example, a user can select a button that opens, closes, minimizes, or maximizes a window, or an icon that launches a particular program. GUI 69 can additionally or alternatively display information, such as non interactive text and graphics, for the user on display device 68.

Computer system 50 can also include input device 70 that is operatively coupled to processor 56. Input device 70 can be configured to transfer data from the outside world into computer system 50. Input device 70 can, for example, be used to perform tracking and to make selections with respect to GUI 69 on display 68. Input device 70 can also be used to issue commands in computer system 50. Input device 70 can include a touch sensing device configured to receive input from a user's touch and to send this information to processor 56. By way of example, the touch-sensing device can correspond to a touchpad or a touch screen. In many cases, the touch-sensing device can recognize touches, as well as the position and magnitude of touches on a touch sensitive surface. The touch sensing device can detect and report the touches to processor 56 and processor 56 can interpret the touches in accordance with its programming. For example, processor 56 can initiate a task in accordance with a particular touch. A dedicated processor can be used to process touches locally and reduce demand for the main processor of the computer system.

The touch sensing device can be based on sensing technologies including but not limited to capacitive sensing, resistive sensing, surface acoustic wave sensing, pressure sensing, optical sensing, and/or the like. Furthermore, the touch sensing means can be based on single point sensing or multipoint sensing. Single point sensing is capable of only distinguishing a single touch, while multipoint sensing is capable of distinguishing multiple touches that occur at the same time.

As discussed above, input device 70 can be a touch screen that can be positioned over or in front of display 68, integrated with display device 68, or can be a separate component, such as a touch pad.

Computer system 50 can also include capabilities for coupling to one or more I/O devices 80. By way of example, I/O devices 80 can correspond to keyboards, printers, scanners, cameras, microphones, speakers, and/or the like. I/O devices 80 can be integrated with computer system 50 or they can be separate components (e.g., peripheral devices). In some cases, I/O devices 80 can be connected to computer system 50 through wired connections (e.g., cables/ports). In other cases, I/O devices 80 can be connected to computer system 80 through wireless connections. By way of example, the data link can correspond to PS/2, USB, IR, Firewire, RF, Bluetooth or the like.

In accordance with one embodiment of the present invention, computer system 50 can be designed to recognize gestures 85 applied to input device 70 and to control aspects of computer system 50 based on the gestures 85. In some cases, a gesture can be defined as a stylized interaction with an input device that can be mapped to one or more specific computing operations. Gestures 85 can be made through various hand, and more particularly finger motions. Alternatively or additionally, the gestures can be made with a stylus. In all of these cases, input device 70 can receive gestures 85 and processor 56 can execute instructions to carry out operations associated with the gestures 85. In addition, memory block 58 can include gesture operational program 88, which can be part of the operating system or a separate application. Gesture operation program 88 can generally include a set of instructions that can recognize the occurrence of gestures 85 and can inform one or more software agents of the gestures 85 and/or what action(s) to take in response to the gestures 85. Additional details regarding the various gestures that can be used as input commands is discussed further below.

In accordance with the preferred embodiment, upon a user performing one or more gestures, input device 70 can relay gesture information to processor 56. Using instructions from memory 58, and more particularly, gesture operational program 88, processor 56 can interpret the gestures 85 and control different components of computer system 50, such as memory 58, display 68 and I/O devices 80, based on the gestures 85. Gestures 85 can be identified as commands for performing actions in applications stored in memory 58, modifying image objects shown on display 68, modifying data stored in memory 58, and/or for performing actions in I/O devices 80.

Again, although FIG. 1 illustrates input device 70 and display 68 as two separate boxes for illustration purposes, the two boxes can be realized on one device.

Figure 2:
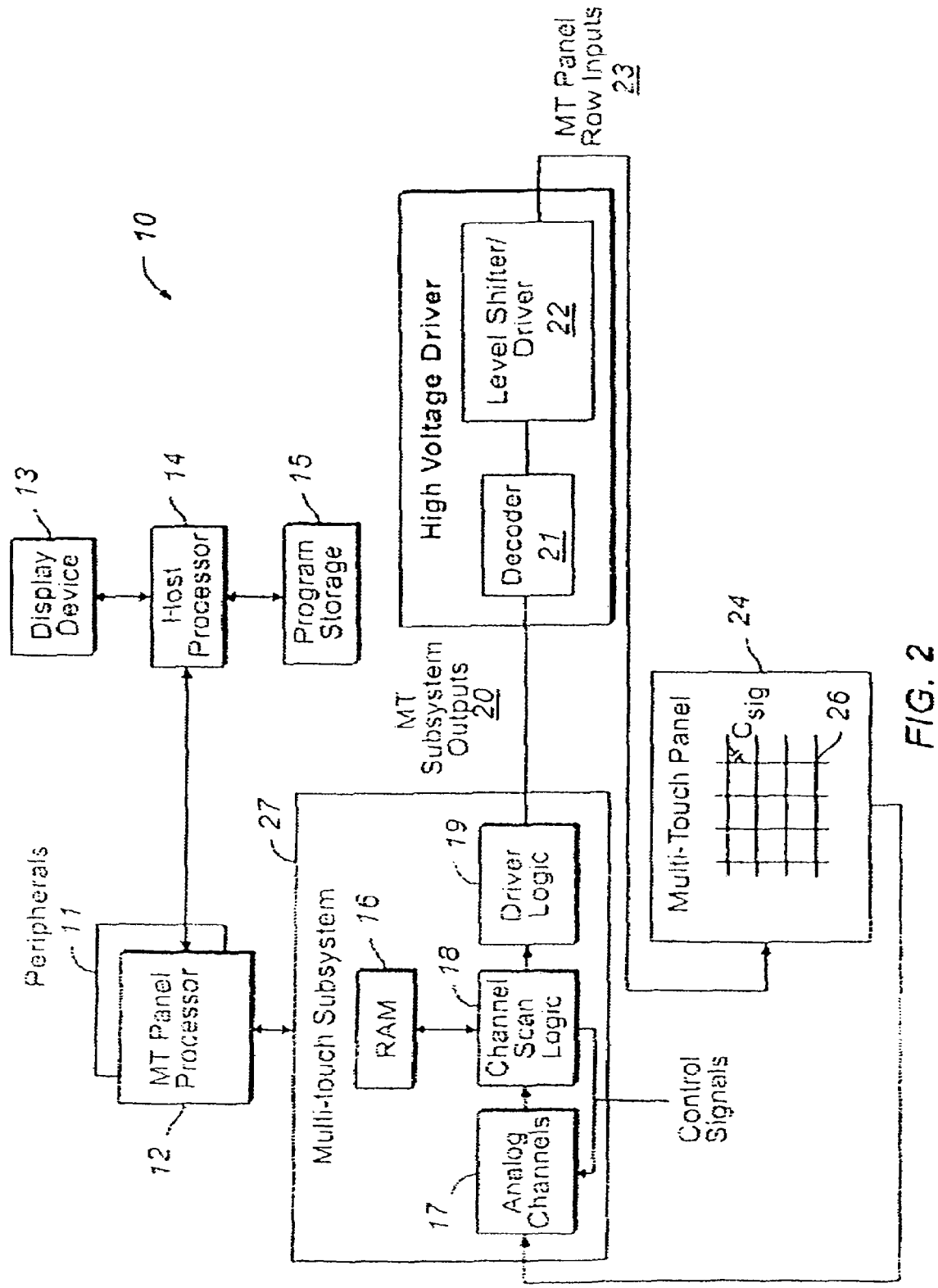
FIG. 2 illustrates another computer system according to an exemplary embodiment of this invention.

FIG. 2 illustrates an exemplary computing system 10 that uses multi-touch panel 24 as an input device for gestures; multi-touch panel 24 can at the same time be a display panel. Computing system 10 can include one or more multi-touch panel processors 12 dedicated to multi-touch subsystem 27. Alternatively, multi-touch panel processor functionality can be implemented by dedicated logic, such as a state machine. Peripherals 11 can include, but are not limited to, random access memory (RAM) or other types of memory or storage, watchdog timers and the like. Multi-touch subsystem 27 can include, but is not limited to, one or more analog channels 17, channel scan logic 18 and driver logic 19. Channel scan logic 18 can access RAM 16, autonomously read data from analog channels 17 and provide control for analog channels 17. This control can include multiplexing columns of multi-touch panel 24 to analog channels 17. In addition, channel scan logic 18 can control driver logic 19 and stimulation signals being selectively applied to rows of multi-touch panel 24. In some embodiments, multi-touch subsystem 27, multi-touch panel processor 12 and peripherals 11 can be integrated into a single application specific integrated circuit (ASIC).

Driver logic 19 can provide multiple multi-touch subsystem outputs 20 and can present a proprietary interface that drives high voltage driver, which can include a decoder 21 and subsequent level shifter and driver stage 22, although level-shifting functions could be performed before decoder functions. Level shifter and driver stage 22 can provide level shifting from a low voltage level (e.g. CMOS levels) to a higher voltage level, providing a better signal-to-noise (S/N) ratio for noise reduction purposes. Decoder 21 can decode the drive interface signals to one out of N outputs, whereas N is the maximum number of rows in the panel. Decoder 21 can be used to reduce the number of drive lines needed between the high voltage driver and multi-touch panel 24. Each multi-touch panel row input 23 can drive one or more rows in multi-touch panel 24. It should be noted that driver 22 and decoder 21 can also be integrated into a single ASIC, be integrated into driver logic 19, or in some instances be unnecessary.

Multi-touch panel 24 can include a capacitive sensing medium having a plurality of row traces or driving lines and a plurality of column traces or sensing lines, although other sensing media can also be used. The row and column traces can be formed from a transparent conductive medium, such as Indium Tin Oxide (ITO) or Antimony Tin Oxide (ATO), although other transparent and non-transparent materials, such as copper, can also be used. In some embodiments, the row and column traces can be formed on opposite sides of a dielectric material, and can be perpendicular to each other, although in other embodiments other non-orthogonal orientations are possible. In a polar coordinate system, for example, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). The rows and columns can be formed on a single side of a substrate, or can be formed on two separate substrates separated by a dielectric material. In some instances, an additional dielectric cover layer can be placed over the row or column traces to strengthen the structure and protect the entire assembly from damage.

At the "intersections" of the traces of multi-touch panel 24, where the traces pass above and below (cross) each other (but do not make direct electrical contact with each other), the traces can essentially form two electrodes (although more than two traces could intersect as well). Each intersection of row and column traces can represent a capacitive sensing node and can be viewed as picture element (pixel) 26, which can be particularly useful when multi-touch panel 24 is viewed as capturing an "image" of touch. (In other words, after multi-touch subsystem 27 has determined whether a touch event has been detected at each touch sensor in the multi-touch panel, the pattern of touch sensors in the multi-touch panel at which a touch event occurred can be viewed as an "image" of touch (e.g. a pattern of fingers touching the panel).) The capacitance between row and column electrodes can appear as a stray capacitance on all columns when the given row is held at DC and as a mutual capacitance Csig when the given row is stimulated with an AC signal. The presence of a finger or other object near or on the multi-touch panel can be detected by measuring changes to Csig. The columns of multi-touch panel 24 can drive one or more analog channels 17 (also referred to herein as event detection and demodulation circuits) in multi-touch subsystem 27. In some implementations, each column can be coupled to one dedicated analog channel 17. However, in other implementations, the columns can be couplable via an analog switch to a fewer number of analog channels 17.

Computing system 10 can also include host processor 14 for receiving outputs from multi-touch panel processor 12 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, etc. Host processor 14, which can be a personal computer CPU, can also perform additional functions that can not be related to multi-touch panel processing, and can be coupled to program storage 15 and display device 13 such as an LCD display for providing a user interface (UI) to a user of the device.

It should be noted that, while FIG. 2 illustrates a dedicated multi-touch panel processor 12, the multi-touch, subsystem can be controlled directly by the host processor 14. Additionally, it should also be noted that multi-touch panel 24 and display device 13 can be integrated into one single touch-screen display device. Further details of multi-touch sensor detection, including proximity detection by a touch panel, is described in commonly assigned co-pending applications, including application Ser. No. 10/840,862 titled "Multipoint Touchscreen," which was published on May 11, 2006 as U.S. Publication No. US2006/0097991; application Ser. No. 11/428,522 titled "Identifying Contacts On A Touch Surface," which was published on Oct. 26, 2006 as U.S. Publication No. 2006/0238522, and U.S. application Ser. No. 11/649,998 entitled "Proximity and Multi-Touch Sensor Detection and Demodulation," filed on Jan. 3, 2007, the entirety of each of which is hereby incorporated herein by reference.

Figure 3:
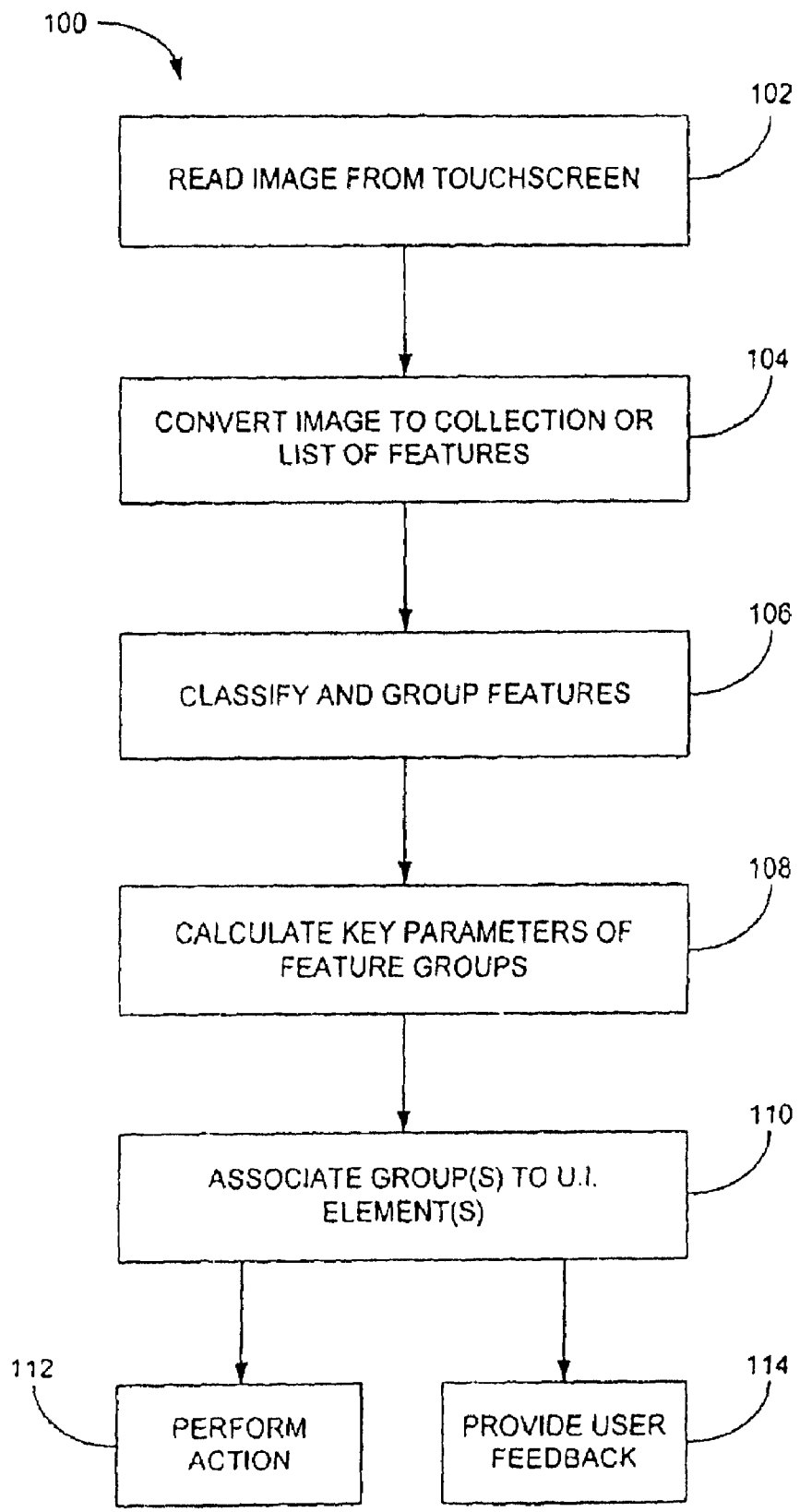
FIG. 3 is a multipoint processing method according to an exemplary embodiment of this invention.

FIG. 3 illustrates a multipoint processing method 100 in accordance with one embodiment of the present invention. Multipoint processing method 100 can, for example, be performed with the system shown in FIG. 1 or FIG. 2. Multipoint processing method 100 generally begins at block 102 where images are read from a multipoint input device, and more particularly a multipoint touch screen. Although the term "image" is used it should be noted that the data can come in other forms. In most cases, the image read from the touch screen provides magnitude (Z) as a function of position (x and y) for each sensing point or pixel of the touch screen. The magnitude can, for example, reflect the capacitance measured at each point.

Figure 4A:
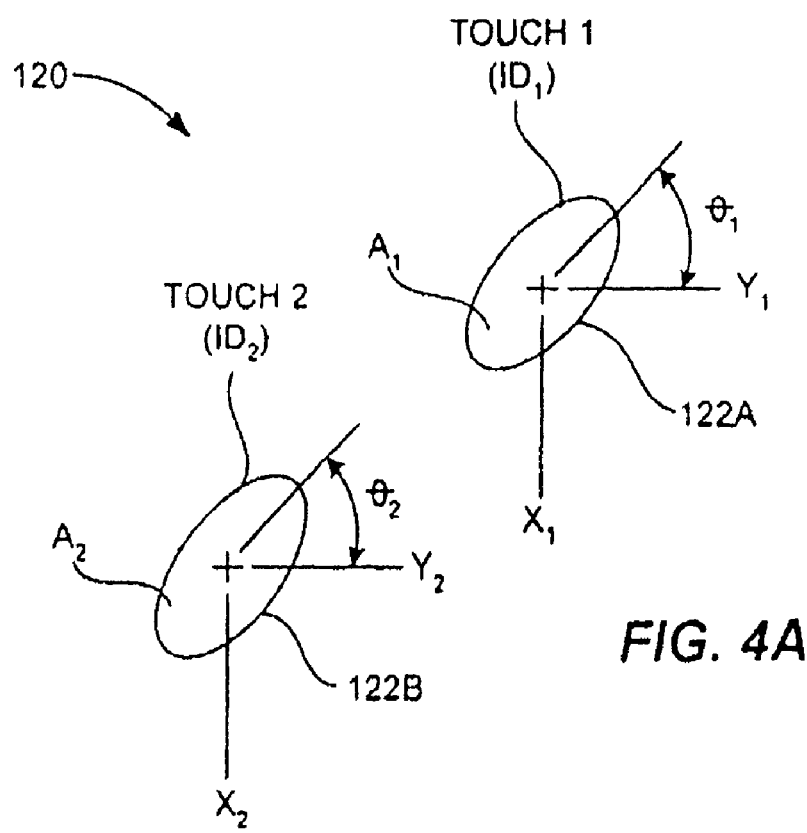
FIGS. 4A and 4B illustrate a detected touch image according to an exemplary embodiment of this invention.
Figure 4B:
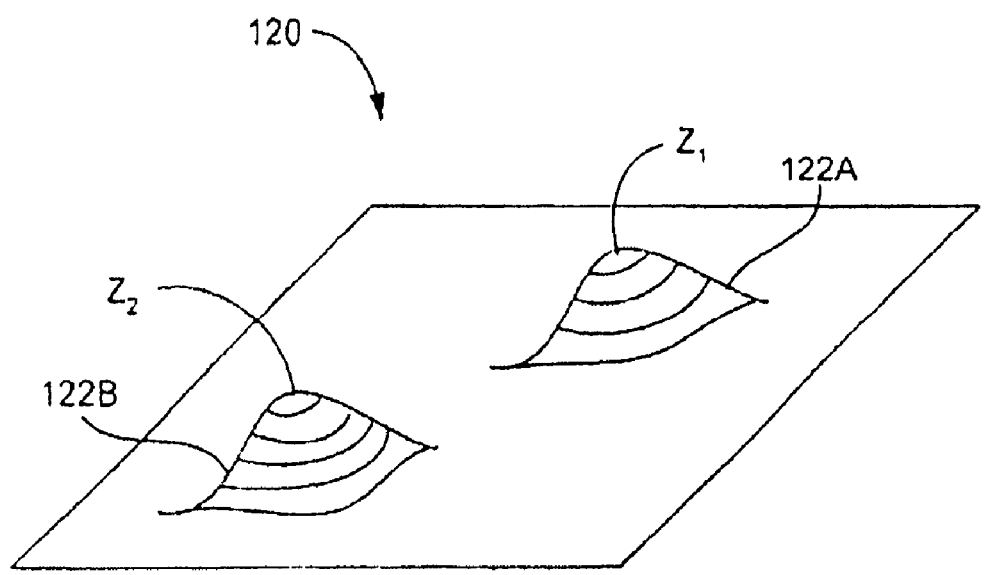

Following block 102, multipoint processing method 100 proceeds to block 104 where the image can be converted into a collection or list of features. Each feature can represent a distinct input such as a touch. In most cases, each feature can include its own unique identifier (ID), x coordinate, y coordinate, Z magnitude, angle Θ, area A, and the like. By way of example, FIGS. 4A and 4B illustrate a particular image 120 in time. In image 120, there are two features 122 based on two distinct touches. The touches can for example be formed from a pair of fingers touching the touch screen. As shown, each feature 122 can include unique identifier (ID), x coordinate, y coordinate, Z magnitude, angle Θ, and area A. More particularly, the first feature 122A is represented by $ID_1, X_1, Y_1, Z_1, \Theta_1, A_1$ and the second feature 122B is represented by $ID_2, X_2, Y_2, Z_2, \Theta_2, A_2$. This data can be outputted for example using a multi-touch protocol.

The conversion from data or images to features can be accomplished using methods described in copending U.S. application Ser. No. 10/840,862 titled "Multipoint Touchscreen," which is hereby again incorporated herein by reference. As disclosed therein, the raw data can be received in a digitized form, and can include values for each node of the touch screen. The values can be between 0 and 256 where 0 equates to no touch pressure and 256 equates to full touch pressure. Thereafter, the raw data can be filtered to reduce noise. Once filtered, gradient data, which indicates the topology of each group of connected points, can be generated. Thereafter, the boundaries for touch regions can be calculated based on the gradient data (i.e., a determination can be made as to which points are grouped together to form each touch region). By way of example, a watershed algorithm can be used. Once the boundaries are determined, the data for each of the touch regions can be calculated (e.g., X, Y, Z, Θ, A).

Following block 104, multipoint processing method 100 proceeds to block 106 where feature classification and groupings can be performed. During classification, the identity of each of the features can be determined. For example, the features can be classified as a particular finger, thumb, palm or other object. Once classified, the features can be grouped. The manner in which the groups are formed can widely vary. In most cases, the features can be grouped based on some criteria (e.g., they carry a similar attribute). For example, the two features shown in FIG. 4A and FIG. 4B can be grouped together because each of these features is located in proximity to each other or because they are from the same hand. The grouping can include some level of filtering to filter out features that are not part of the touch event. In filtering, one or more features can be rejected because they either meet some predefined criteria or because they do not meet some predefined criteria. By way of example, one of the features can be classified as a thumb located at the edge of a tablet PC. Because the thumb is being used to hold the device rather than being used to perform a task, the feature generated therefrom can be rejected, i.e., is not considered part of the touch event being processed.

Figure 5:
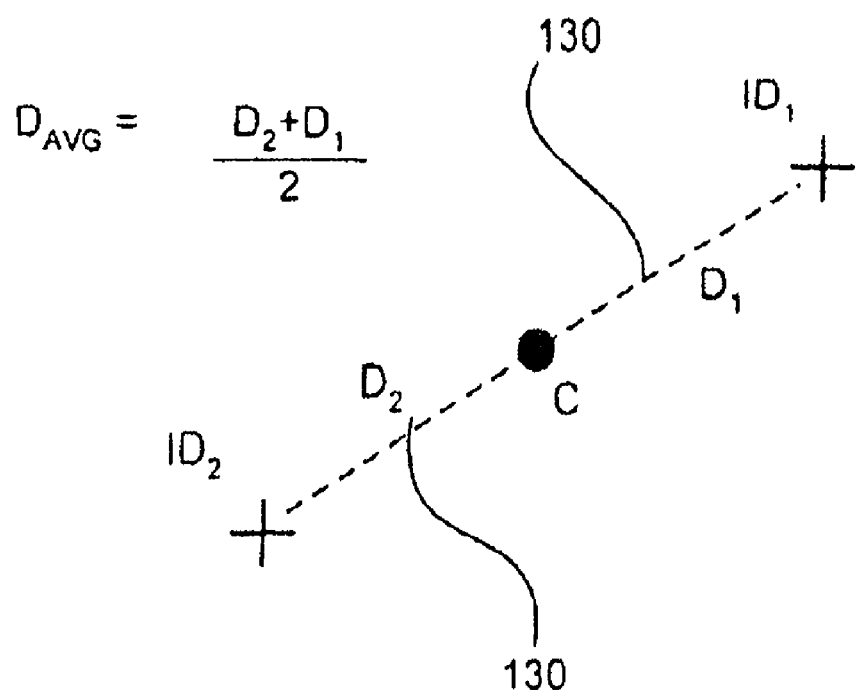
FIG. 5 illustrates a group of features according to an exemplary embodiment of this invention.

Following block 106, multipoint processing method 100 proceeds to block 108 where key parameters for the feature groups can be calculated. The key parameters can include distance between features, x/y centroid of all features, feature rotation, total pressure of the group (e.g., pressure at centroid), and the like. As shown in FIG. 5, the calculation can include finding the centroid C, drawing a virtual line 130 to each feature from the centroid C, defining the distance D for each virtual line ($D_1$ and $D_2$), and then averaging the distances $D_1$ and $D_2$. Once the parameters are calculated, the parameter values can be reported. The parameter values can be typically reported with a group identifier (GID) and number of features within each group (in this case three). In most cases, both initial and current parameter values can be reported. The initial parameter values can be based on set down, i.e., when the user sets their fingers on the touch screen, and the current values can be based on any point within a stroke occurring after set down.

As should be appreciated, blocks 102-108 can be repetitively performed during a user stroke thereby generating a plurality of sequentially configured signals. The initial and current parameters can be compared in later steps to perform actions in the system.

Following block 108, the process flow proceeds to block 110 where the group can be associated with a user interface (UI) element. UI elements can be buttons boxes, lists, sliders, wheels, knobs, etc. Each UI element can represent a component or control of the user interface. The application behind the UI element(s) can have access to the parameter data calculated in block 108. In one implementation, the application can rank the relevance of the touch data to the UI element corresponding there to. The ranking can be based on some predetermined criteria. The ranking can include producing a figure of merit and, whichever UI element has the highest figure of merit, giving it sole access to the group. There can even be some degree of hysteresis as well (e.g., once one of the UI elements claims control of that group, the group sticks with the UI element until another UI element has a much higher ranking). By way of example, the ranking can include determining proximity of the centroid (or features) to the image object associated with the UI element.

Following block 110, multipoint processing method 100 proceeds to blocks 112 and 114. Blocks 112 and 114 can be performed approximately at the same time. From the user perspective, in one embodiment, blocks 112 and 114 appear to be performed concurrently. In block 112, one or more actions can be performed based on differences between initial and current parameter values, and can also be based to a UI element to which they are associated, if any. In block 114, user feedback pertaining to the one or more action being performed can be provided. By way of example, user feedback can include display, audio, tactile feedback and/or the like.

Figure 6:
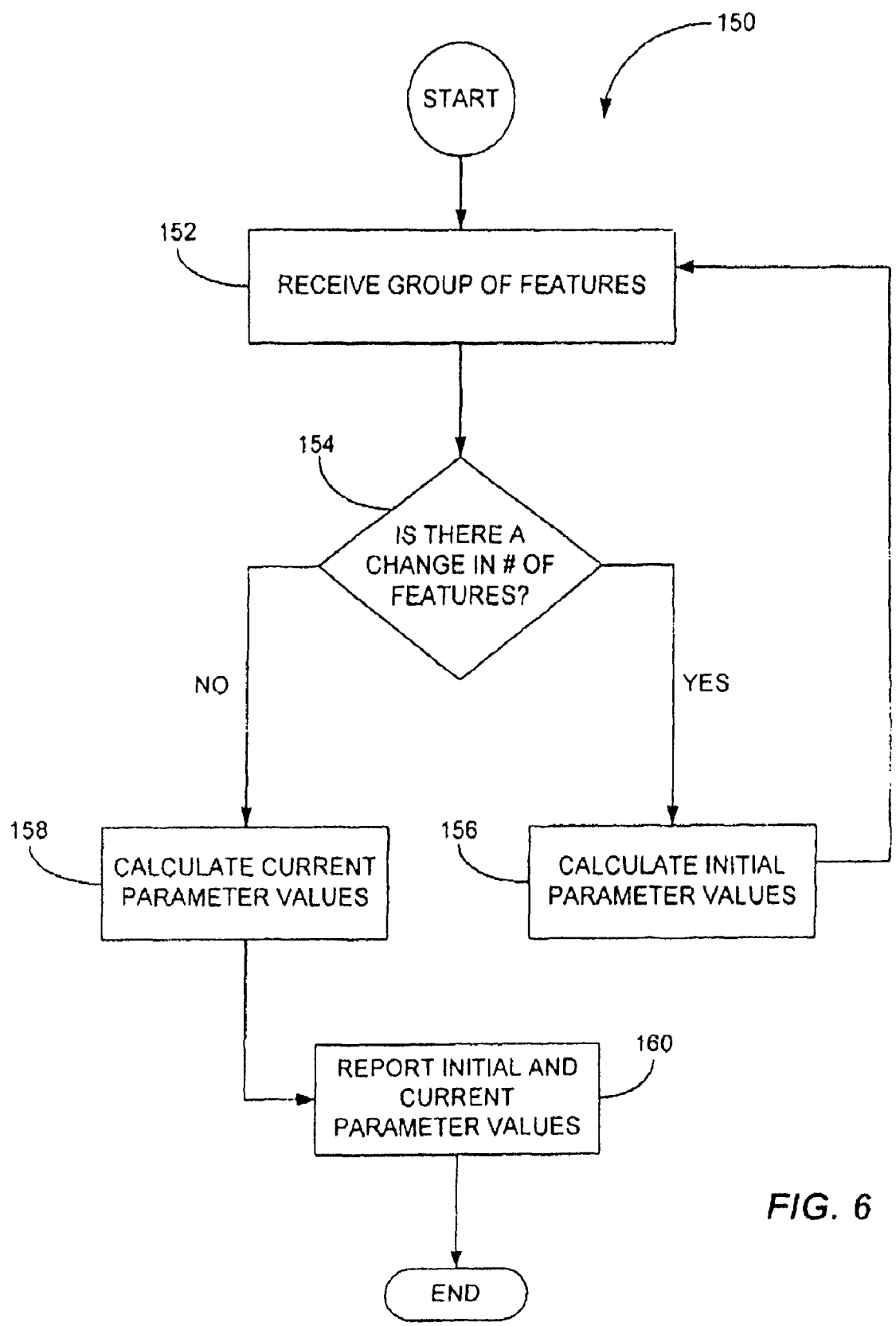
FIG. 6 is a parameter calculation method according to an exemplary embodiment of this invention.

FIG. 6 illustrates a parameter calculation method 150 in accordance with one embodiment of the present invention. Parameter calculation method 150 can, for example, correspond to block 108 shown in FIG. 3. The parameter calculation method 150 generally begins at block 152 where a group of features can be received. Following block 152, the parameter calculation method 150 proceeds to block 154 where a determination can be made as to whether or not the number of features in the group of features has changed. For example, the number of features can have changed due to the user picking up or placing an additional finger. Different fingers can be needed to perform different controls (e.g., tracking, gesturing). If the number of features has changed, the parameter calculation method 150 proceeds to block 156 where the initial parameter values can be calculated. If the number stays the same, the parameter calculation method 150 proceeds to block 158 where the current parameter values can be calculated. Thereafter, the parameter calculation method 150 proceeds to block 150 where the initial and current parameter values can be reported. By way of example, the initial parameter values can contain the average initial distance between points (or Distance (AVG) initial) and the current parameter values can contain the average current distance between points (or Distance (AVG) current). These can be compared in subsequent steps in order to control various aspects of a computer system.

The above methods and techniques can be used to implement any number of GUI interface objects and actions. For example, gestures can be created to detect and effect a user command to resize a window, scroll a display, rotate an object, zoom in or out of a displayed view, delete or insert text or other objects, etc.

Figure 7:
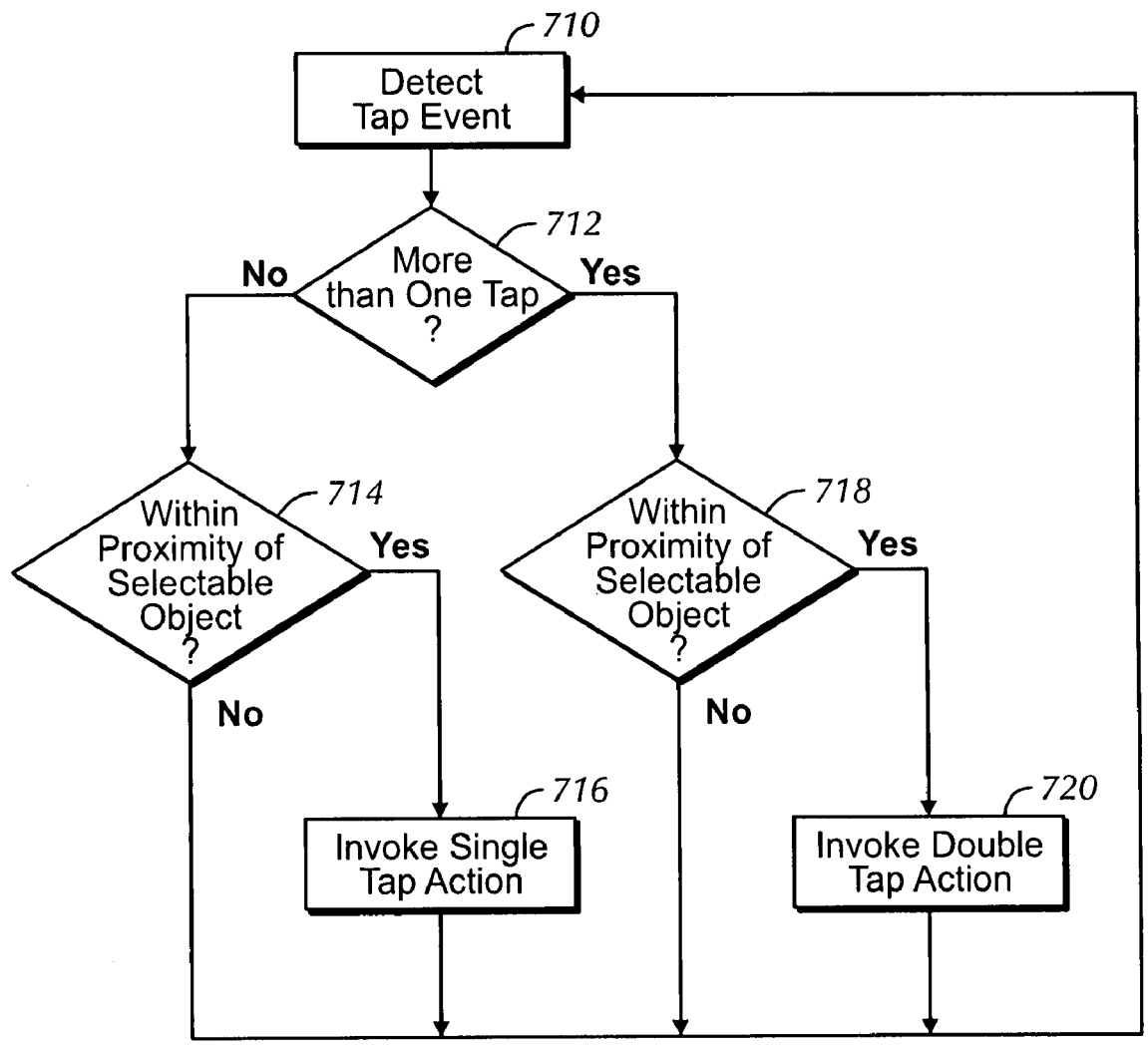
FIG. 7 is flow chart of a tap event detection method according to an exemplary embodiment of this invention.

A basic category of gestures can allow a user to input common commands that may be inputted through the use of a conventional mouse or trackball instrument. FIG. 7 shows a flow chart for processing the detection of mouse-click actions in accordance with one embodiment. Starting with block 710, detection can be made as to whether a tap event occurred. A tap event can include a user tapping one or more fingers on a multi-event sensor panel (such as panel 24 of FIG. 2). Next, in block 712, it can be determined whether one or more tap events occurred within a predetermined amount of time. As should be appreciated, the predetermined amount of time can be any reasonable amount of time in which a user would take to perform a double tap on a surface of a sensor panel, for example less than one second or even less than half of a second. If the tap event detected is determined in decision block 712 to be a single tap, then a determination (block 714) can be made as to whether the touch event occurred within a predetermined proximity of a GUI object associated with a selectable file, and, if so, then a selection action associated with a single tap can made in block 716. For example, a single tap can perform what a single mouse-click action would normally perform on the GUI object. Referring back to block 712, if a double tap event is detected, then a determination (block 718) can be made as to whether the tap event was within a predetermined proximity of a GUI object. If so, then a selection action associated with a double tap can made in block 720. For example, a double tap can perform what a double mouse-click action would normally perform on the GUI object. In one embodiment, a double tap action can be determined by the detection of a finger leaving the sensor panel and substantially immediately retouching the sensor panel twice. In accordance with an alternative embodiment, a double tap action can also be invoked if it is detected that a touch event on a selectable GUI object remains for more than a predetermined period of time, such as a finger remaining on a UI for more than two seconds.

In another embodiment, if a touch event detected is associated with a with a network address hyperlink, then a tap event, such as a single tap or a plurality of taps, can invoke a process for activating the hyperlink. Moreover, a browser application could be launched automatically if the hyperlink was touched within a non-browser environment.

In yet a further variation, a two finger touch event can invoke certain mouse-click functions. For example, a two finger touch event occurring within a predefined proximity of a selectable GUI object can invoke a double-click mouse action on the object. Moreover, a tap by one of the two fingers within a predetermined amount of time (for example the right-most finger of the two fingers) can invoke a right-click mouse action.

Figure 8:
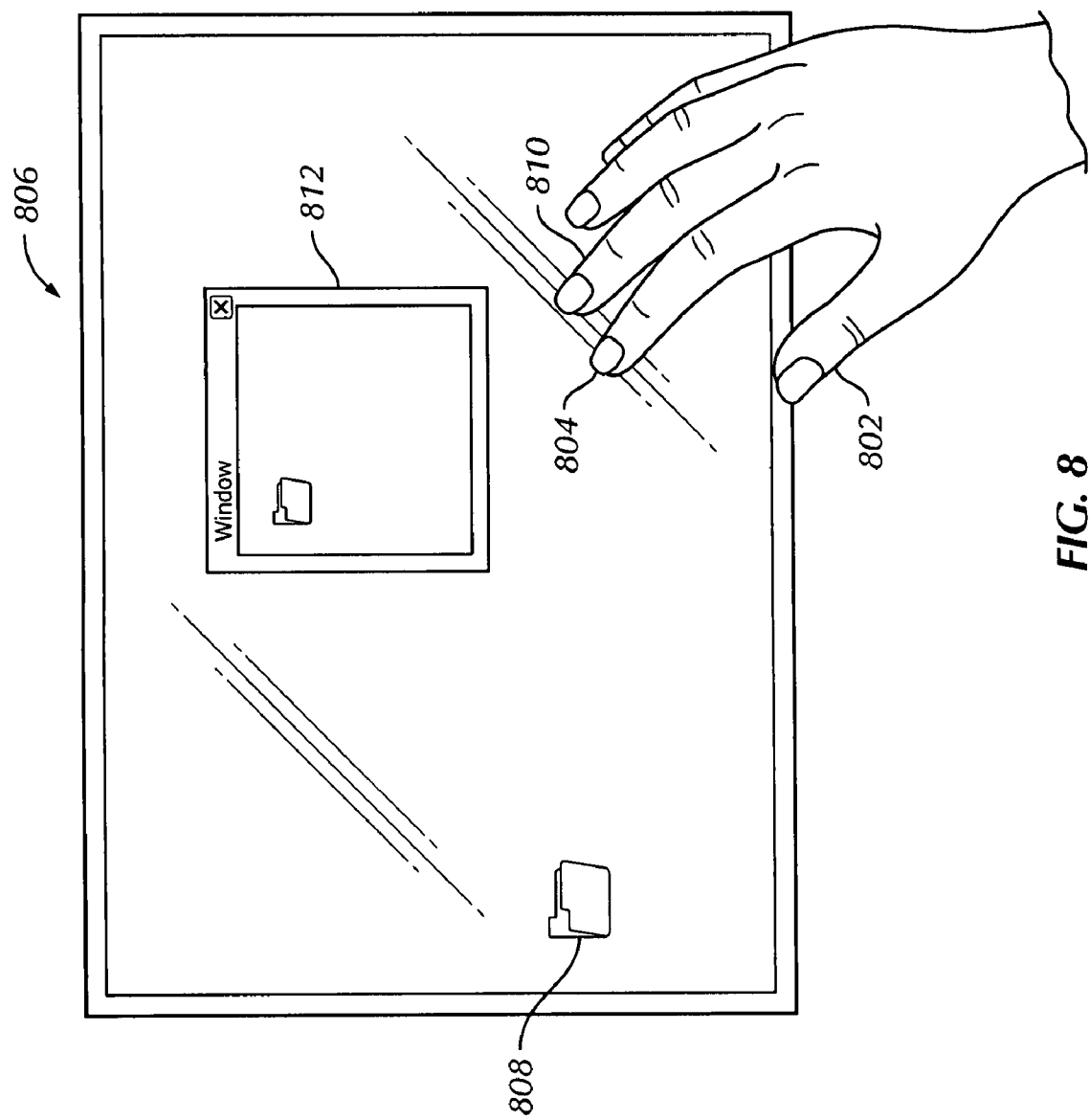
FIG. 8 illustrates several event-sensitive gestural actions according to an exemplary embodiment of this invention.

By way of example, FIG. 8 illustrates an implementation of the above discussed gestural actions. As shown in FIG. 8, a single finger tap with finger 804 on a GUI object, such as file icon 808, can be translated into the equivalent of a single click of a mouse, which in this instance can indicate a selection. A single mouse click selection can be indicated by highlighting of the selected icon. A detected double tap event on icon 808 can be translated into the equivalent of a double click of a mouse, which can invoke a launch or opening of an application the selected object. For instance, a double tapping of file icon 808 can open a window 812 associated with file icon 808.

In accordance with one embodiment, a drag-and-drop function can be invoked by touching sensor screen with at least one finger in close proximity to a GUI object and graphically dragging the GUI object to a desired drop location by maintaining the touch until the GUI object is at the desired location and then lifting the finger away from the sensor panel. By way of example with reference to FIG. 8, file icon 808 can be dragged and dropped into open window file folder 812 by touching multi-event sensor screen 806 at the location of file icon 808 with finger 804 and then dragging finger 804 to window 812. File icon 808 can then be dropped into window 812 by lifting finger 804 away from sensor screen 806.

In an alternative embodiment, a finger pinching gesture in the proximity of a GUI object can indicate grabbing the GUI object. A user can then drag the GUI object to a desired location by hovering the pinched-together fingers above the sensor panel surface and moving the fingers to the desired drop location. Detection of hover events are described in, greater detail in commonly assigned co-pending U.S. application Ser. No. 10/840,862 entitled "Multipoint Touchscreen," published as U.S. Publication No. US2006/0097991, co-pending U.S. application Ser. No. 11/649,998 entitled "Proximity and Multi-Touch Sensor Detection and Demodulation," filed on Jan. 3, 2007, co-pending U.S. application Ser. No. 11/619,595 entitled "Multi-Event Input System," filed on Jan. 3, 2007, and U.S. application Ser. No. 11/619,464 entitled "Multi-Touch Input Discrimination," filed on Jan. 3, 2007, the contents of each of which are incorporated herein by reference. A user can then drop the GUI object by spreading the pinched together fingers apart above the desired drop location or, alternatively, tapping the sensor panel surface at the desired drop location by spreading apart the fingers.

In accordance with one embodiment, a touch event can invoke one of a number of modes of operation. By way of example with reference to FIG. 8, nearly simultaneous placement of thumb 802 and index finger 804 on sensor panel 806 can invoke a scrolling mode of operation. In one embodiment, detecting a touch event of thumb 802 and index finger 804 in relative close proximity to one another can invoke the scrolling mode of operation. A scrolling action can then occur by the user keeping thumb 802 in a fixed position (e.g., as an anchor point) and moving index finger 804 away from the thumb and/or rotate index finger 804 about thumb 802. If scrollable in only one direction (e.g., up and down), then the scrolling action invoked can be a unidirectional scroll. If the scrollable area is scrollable bi-dimensionally, then the scrolling action invoked can be omnidirectional.

In one implementation, if the detected gesture is thumb 802 and only one other finger, such as index finger 804, then scrolling action can be performed at a normal, or 1×, speed. However, if the detected touch event is thumb 802 and two other fingers, such as index finger 804 and middle finger 810, then scrolling action can be performed at a double, or 2×, speed. Additional fingers can be added to perform even faster scrolling action. Moreover, in a further implementation, detection of thumb 802 and then all four of the other fingers can be translated into "page up" or "page down" commands within a multi-page document window, where moving the four other fingers up indicates a "page up" action and moving all fingers down indicates a "page down" action. Accordingly, the addition or subtraction of the number of fingers used in a gesture can switch from a velocity control function to a position control function.

A "mouse-over" function can also be emulated in accordance with one embodiment of the present invention. As used herein, "mouse-over" generally refers to moving a mouse icon over a GUI object in, for example, an Apple Mac desktop or Microsoft Windows desktop environment. Typically, performing a "mouse-over" over a GUI object does not by itself select the GUI object. Instead, a user will typically also need to perform one or more mouse clicks to select or open the GUI object.

In accordance with an embodiment, hovering one or more fingers above a sensor surface can emulate a "mouse-over" function. In one implementation, hovering over a GUI object can cause the GUI object to become larger by, for example, initiating a rolling popup action. Furthermore, maintaining the hover over the GUI object for a predetermined amount of time can cause the GUI object to be opened or otherwise selected. These features can aid a user in conveniently selecting one of a plurality of GUI objects by hovering over a first GUI object to first provide a better indication if that GUI object is the object the user wants to open or select and then maintaining the hover over the object to open or select the GUI object. Alternatively, the user can select a GUI object by tapping the sensor display panel with one or more taps at the location of the GUI object instead of maintaining the hover.

Figure 9:
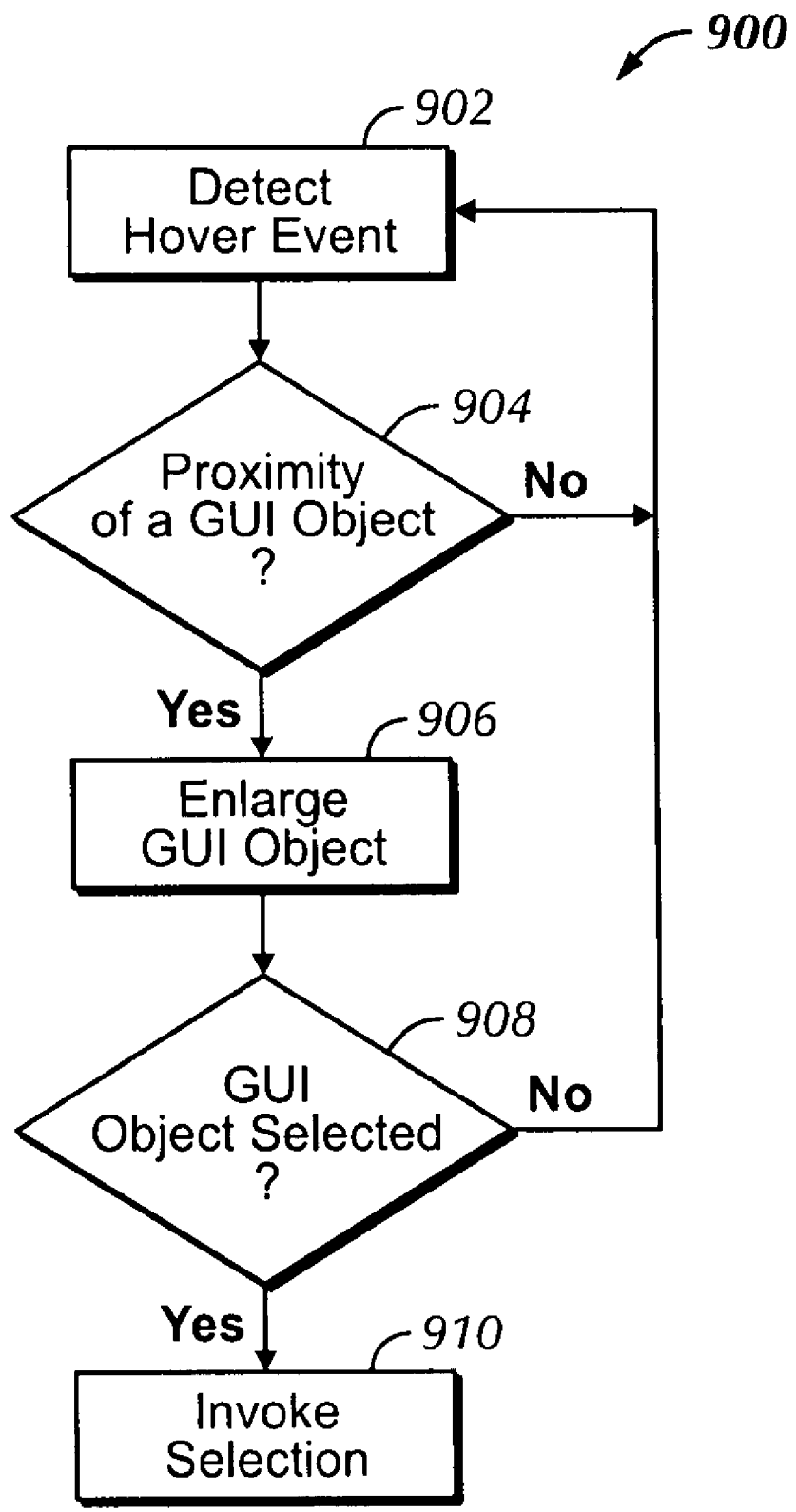
FIG. 9 is a flow chart of a "mouse-over" detection and selection method according to an exemplary embodiment of this invention.

A flowchart of an exemplary "mouse-over" process 900 in accordance with one embodiment is shown in FIG. 9. Process 900 begins with detection of a hover event in block 902. Detection of a hover event is described in more detail in the above-referenced co-pending U.S. application Ser. No. 11/649,998 entitled "Proximity and Multi-Touch Sensor Detection and Demodulation" and filed on Jan. 3, 2007, the contents of which are again incorporated herein by reference. Upon detection of a hover event, it can be determined whether the hover event is within a predetermined proximity to a GUI object (block 904). If the hover event is determined not to be within a predetermined proximity to a GUI object, then process 900 can return to block 902. However, if it within the predefined proximity, then that GUI object can be enlarged in block 906. For example, a GUI object can be a thumbnail of a photo file within a photo management software application. Hovering over a photo thumbnail can enlarge the thumbnail but not select the thumbnail. This can permit the user to get a better view of the photo thumbnail prior to deciding whether or not to select or otherwise control the photo thumbnail. This can be of particular advantage on smaller display screens where it can be difficult to discern a GUI object in its normal smaller size.

Next, process 900 can determine whether the user indicated a selection of the GUI object that was enlarged in block 906. A user can indicate a selection in a number of different ways. For example, a user can indicate a selection by maintaining the hover over the GUI object for a predetermined amount of time. Another way for a user to indicate a selection can be by tapping the sensor display panel within a predetermined proximity of the displayed GUI object. As should be appreciated, other methods of selection can also be used. If selected, then the selection is invoked in block 910. If no selection is indicated in block 908, then process 900 returns to block 902.

Accordingly, in process 900, a GUI object can remain enlarged as long as a user maintains a hover event within the predetermined proximity of the GUI object, as process 900 can be repeated as a loop. However, once a hover event is no longer detected within the predetermined proximity of the GUI object, then the GUI object can return to its normal size.

Process 900 can have several advantages. For example, process 900 can permit a user to perform a "mouse-over" type function using a multi-event sensing display. Moreover, process 900 can provide a "targeting" function in that it can enable a user to obtain a better view of a GUI object by making a desired GUI object larger. This can be of particular advantage when viewing thumbnails of photos in a photo management software application environment. Process 900 can also allow a user to select or otherwise control an enlarged GUI object through the use of, for example, further gestures.

Moreover, in one embodiment, two or more "mouse-over" functions can occur simultaneously or nearly simultaneously. For example, a user can use one finger to perform a mouse-over function on first GUI object and a second finger to perform a mouse-over function on second GUI object. Accordingly, a user can "target" two objects simultaneously.

Other gestures can also be used in a desktop type of environment. In one embodiment, the number of fingers used in a gesture determines a level of controlling desktop applications. For instance, using one finger can be used to control a single low-level object, using two fingers can be used to control a window, and using three fingers can control all windows on a desktop at once. Accordingly, a higher level of control can be achieved by using more fingers in a gesture. In an alternative embodiment, a higher level of control can be achieved by using fewer fingers in a gesture.

Figure 10:
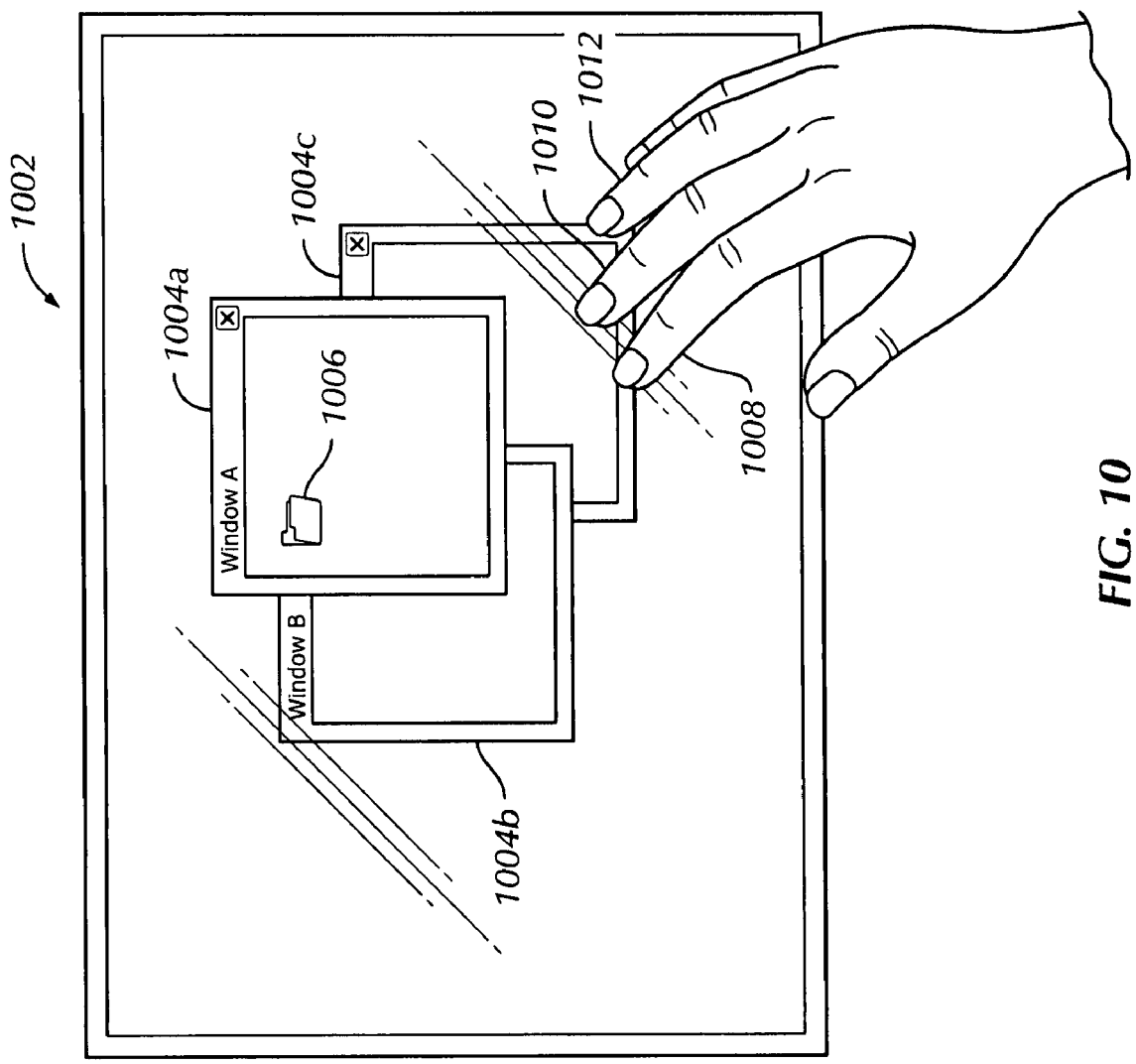
FIG. 10 illustrates further event-sensitive gestural actions according to an exemplary embodiment of this invention.

A specific example of hierarchy control is provided with reference to FIG. 10. In FIG. 10, multi-event sensor display panel 1002 (which can be a combination of panel 24 and display 13 of FIG. 2) is displaying three open application windows 1004a, 1004b, and 1004c. A user can control (e.g., drag and drop or open) a lower level object by using a one finger gesture, such as placing finger 1008 on file icon 1006. If a user desires to control a single open window, such as window 1004a, then the user can use a two fingers gesture, such as placing fingers 1008 and 1010 on window 1004a. Moreover, a user can control all open windows 1004a, 1004b and 1004c by using a three finger gestures, such as placing fingers 1008, 1010 and 1012 on sensor display panel 1002. Accordingly, a user can conveniently control different hierarchal levels of a desktop application by varying the number of fingers used in a gesture.

Alternatively, the amount of control can be determined by the degree a user's fingers are spread apart. For example, a first control state can occur when a plurality of fingers, such as fingers 1008, 1010 and 1012, are close together. This first control state can correspond to controlling a single selectable file, such as file 1006. A second control state can occur when a plurality of fingers as spread slightly apart. This second control state can correspond to controlling an open window, such as window 1004a. A third control state can occur when the plurality of fingers are spread further apart. This third control state can correspond to controlling all open windows 1004a, 1004b and 1004c. As should be appreciated, further control states can be achieved by spreading the plurality of fingers out even more. Moreover, a combination of the number of fingers used in a gesture and how far the fingers are spread apart in the gesture can achieve different control states.

In one embodiment, a calibration process can be used to calibrate a computing system, such as system 10, to differentiate between different control states. For example, computing system 10 can have a user perform a number of different gestures during a calibration process, where each gesture corresponds to a control state. A user can then use the appropriate gesture to later invoke the corresponding control state. Alternatively or in addition, computing system 10 can initially capture and store a user's fingerprint sizes, hand reach and other pertinent data. The captured data can then be used to help computer system 10 differentiate between gestures of a particular user, as one user would likely perform a hand gesture differently from a second user.

In another embodiment, a user can perform a "push through" function. A "push through" can generally refer to bringing a second GUI object in front of a first GUI object. This function can typically be used in a desktop environment, but can also be used in other environments. The "push through" function can be implemented by a user touching a sensor panel at a particular location for a predetermined amount of time. For example, referring to FIG. 10, a user can hold finger 1008 at a location where first window 1004a overlaps second window 1004b for a predetermined amount of time. After the predetermined amount of time, second window 1004b is displayed in front of first window 1004a. The predetermined amount of time can be, for example, about two seconds.

It should be noted that the methods described above can be implemented simultaneously during the same gestural stroke. For example, the user can spread and close their fingers while rotating and sliding them across the touch screen. Alternatively, the user can segment each of these motions without having to reset the gestural stroke. For example, the user can first spread their fingers, then rotate their fingers, then close their fingers, then slide their fingers and so on.

It should also be noted that it is not necessary to always use a human finger to effect gestural input. Where possible, it is also sufficient to use a pointing device, such as a stylus, to effect gestural input.

Additional examples of gestural strokes that can be used as inputs for effecting interface commands, including interactions with UI elements (e.g., a virtual scroll wheel), are shown and described in commonly assigned co-pending U.S. application Ser. No. 11/038,590 entitled "Mode-Based Graphical User Interfaces For Touch Sensitive Input Devices" and published on Feb. 2, 2006 as U.S. Publication No. US2006/0026535, the entirety of which is hereby incorporated by reference.

Figure 11:
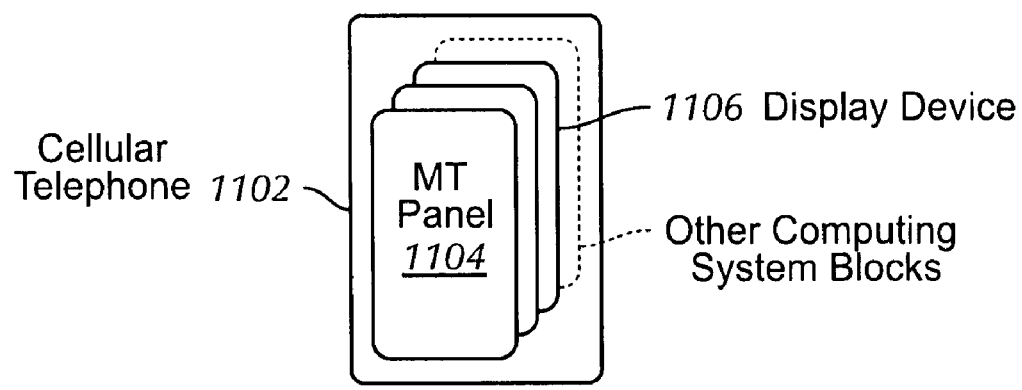
FIG. 11 illustrates a mobile telephone that can include multi-event sensor panel, display device, and other computing system blocks according to an exemplary embodiment of this invention.
Figure 12:
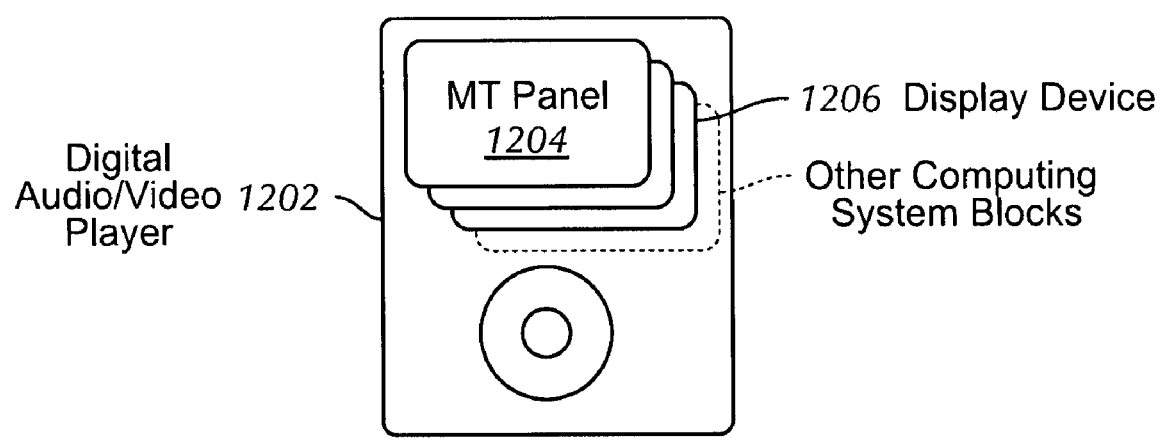
FIG. 12 illustrates a digital audio/video player that can include a multi-event sensor panel, a display device, and other computing system blocks according to an exemplary embodiment of this invention.

In accordance with one embodiment, FIG. 11 illustrates an exemplary mobile (e.g., cellular) telephone 1102 that can include multi-event sensing panel 1104, display device 1106, and other computing system blocks in computing system 10 of FIG. 2. In addition, FIG. 12 illustrates an exemplary digital media player 1202 that can include multi-event sensing panel 1204, display device 1206, and other computing system blocks in computing system 10 of FIG. 2. Both telephone 1102 and digital media player 1202 can detect gestural strokes that can be used as inputs for effecting interface commands.

Although many of the embodiments of the present invention are described herein with respect to personal computing devices, it should be understood that the present invention is not limited to personal computing applications, but is generally applicable to other applications.

Many alterations and modifications can be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

What is claimed is:

1. A computer implemented method for processing event inputs using a touch sensing device, said method comprising:
    displaying a plurality of GUI (graphical user interface) objects on a display;
    detecting an event input of a number of fingers touching the touch sensing device;
    identifying a control state associated with the event input, wherein the control state comprises one of a first control state, a second control state and a third control state, the first control state providing control of a first level GUI object, the second control state providing control of a second level GUI object, and the third control state providing control of a third level GUI object, wherein the first control state is identified by the event input indicating a first number of fingers touching the touch sensing device, the second control state is identified by the event input indicating a second number of fingers touching the touch sensing device, and the third control state is identified by the event input indicating a third number of fingers touching the touch sensing device; and
    controlling one or more of the GUI objects in accordance with the identified control state.

2. The computer implemented method of claim 1, wherein the first level GUI object is a selectable file icon, the second level GUI object is an open file window, and the third level GUI object is all open file windows.

3. The computer implemented method of claim 1, wherein the third level GUI object includes a plurality of GUI objects.

4. The computer implemented method of claim 1, wherein the first number of fingers is one finger, the second number of fingers is two fingers, and the third number of fingers is three fingers.

5. The computer implemented method of claim 1, wherein controlling the one or more GUI objects includes one of a move operation, a view operation, a select operation, a scroll operation, and an open operation.

6. The computer implemented method of claim 1, wherein the first level GUI object includes an object within an application window, the second level GUI object includes the application window, and the third level GUI object includes a plurality of application windows.

7. The computer implemented method of claim 6, wherein the third level GUI object includes all open application windows.

8. The computer implemented method of claim 6, wherein the object within the application window includes a selectable icon.

9. An apparatus comprising:
a display that displays a plurality of GUI (graphical user interface) objects;
a touch sensing device that detects an event input of a number of fingers touching the touch sensing device; and
a controller that controls a first level GUI object when the event input indicates a first number of fingers touching the touch sensing device, controls a second level GUI object when the event input indicates a second number of fingers touching the touch sensing device, and controls a third level GUI object when the event input indicates a third number of fingers touching the touch sensing device.

10. The apparatus of claim 9, wherein the first level GUI object is a selectable file icon, the second level GUI object is an open file window, and the third level GUI object is all open file windows.

11. The apparatus of claim 9, wherein the third level GUI object includes a plurality of GUI objects.

12. The apparatus of claim 9, wherein the controller controls one of the first, second, and third level GUI objects to perform one of a move operation, a view operation, a select operation, a scroll operation, and an open operation.

13. The apparatus of claim 9, wherein the first level GUI object includes an object within an application window, the second level GUI object includes the application window, and the third level GUI object includes a plurality of application windows.

14. The apparatus of claim 13, wherein the plurality of application windows includes all open application windows.

15. The apparatus of claim 13, wherein the object within the application window includes a selectable icon.

16. A non-transitory computer-readable storage medium storing computer-readable program instructions executable to perform a method for processing event inputs using a touch sensing device, the method comprising:
displaying a plurality of GUI (graphical user interface) objects on a display;
detecting an event input of a number of fingers touching the touch sensing device;
controlling a first level GUI object when the event input indicates a first number of fingers touching the touch sensing device;
controlling a second level GUI object when the event input indicates a second number of fingers touching the touch sensing device; and
controlling a third level GUI object when the event input indicates a third number of fingers touching the touch sensing device.

17. The computer-readable storage medium of claim 16, wherein the first level GUI object is a selectable file icon, the second level GUI object is an open file window, and the third level GUI object is all open file windows.

18. The computer-readable storage medium of claim 16, wherein the third level GUI object includes a plurality of GUI objects.

19. The computer-readable storage medium of claim 16, wherein controlling one of the first, second, and third level GUI objects includes performing one of a move operation, a view operation, a select operation, a scroll operation, and an open operation.

20. The computer-readable storage medium of claim 16, wherein the first level GUI object includes an object within an application window, the second level GUI object includes the application window, and the third level GUI object includes a plurality of application windows.

21. The computer-readable storage medium of claim 20, wherein the plurality of application windows includes all open application windows.

22. The computer-readable storage medium of claim 20, wherein the object within the application window includes a selectable icon.

* * * * *

UNITED STATES PATENT AND TRADEMARK OFFICE
CERTIFICATE OF CORRECTION

| | | |
|---|---|---|
| PATENT NO. | : 7,924,271 B2 | Page 1 of 1 |
| APPLICATION NO. | : 11/818341 | |
| DATED | : April 12, 2011 | |
| INVENTOR(S) | : Christie et al. | |

It is certified that error appears in the above-identified patent and that said Letters Patent is hereby corrected as shown below:

In FIG. 2 of drawing sheet 2 of 11, delete "Mulli-touch" and insert -- Multi-touch --, therefor.

Signed and Sealed this
Twenty-ninth Day of November, 2011

David J. Kappos
*Director of the United States Patent and Trademark Office*